June 9, 1942. M. WEFERS 2,285,546
COMPRESSION CHAMBER LEAKAGE TESTER
Filed Aug. 5, 1939
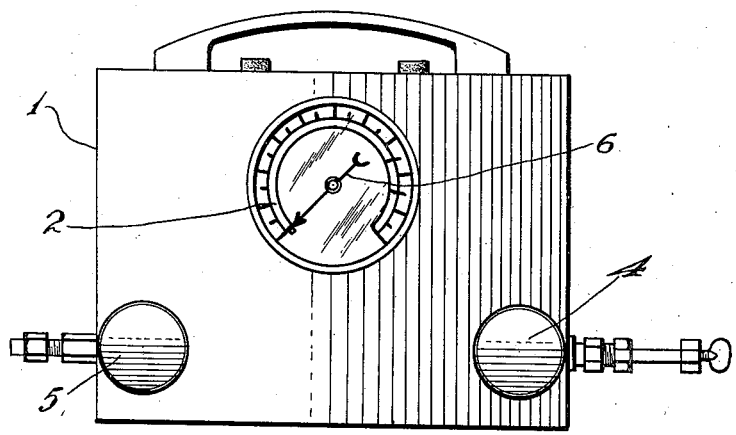
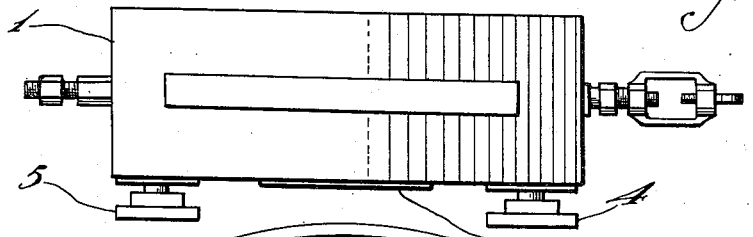
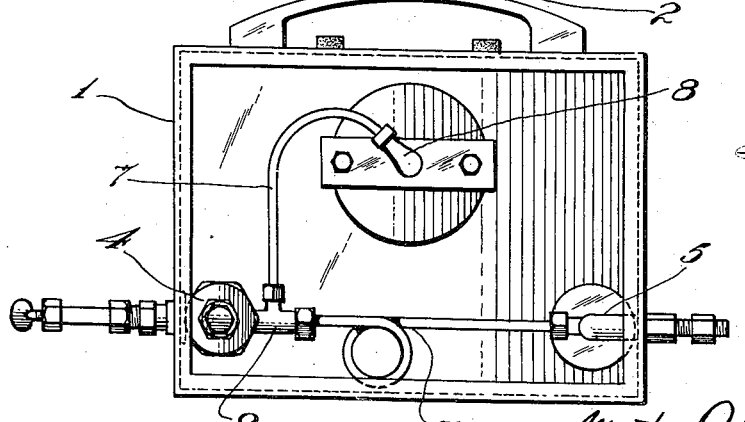
Martin Wefers
INVENTOR

Patented June 9, 1942

2,285,546

UNITED STATES PATENT OFFICE 2,285,546

COMPRESSION CHAMBER LEAKAGE TESTER

Martin Wefers, Union, N. J., assignor to Claude J. Parkhill, Newark, N. J., Richard F. Tighe, Maplewood, N. J., and Walter W. Stillmen, Tenafly, N. J.

Application August 5, 1939, Serial No. 288,535

2 Claims. (Cl. 73—51)

This invention relates to new and useful improvements in a device for determining the gastightness of compression chambers, and more particularly for measuring the leakage of air or gas from the cylinders of internal combustion engines. It has for its primary object to provide a device of this character which not only calibrates the power loss due to leakage but locates the point or points of leakage. Heretofore it has been very difficult for these two objects to be attained in one device that is simple, efficient and cheap. I am aware that devices of this character are already patented and on the market, but they have been complicated, expensive and inefficient. My device overcomes many of the disadvantages of these prior devices and is compact, accurate, efficient, fool proof and cheap. Heretofore it has been impossible to operate a device of this character without having highly technical knowledge of calibration and instruments, and because of this they have had a limited field and have not been saleable to garage men. My device, however, is adapted to both laboratory and ordinary use. Having thus described certain of the advantages of my invention, I refer now to the drawing in which Figure 1 represents a face view of the preferred form of my device; Figure 2 is a top plan view of the same; Figure 3 is a rear view of the form as shown in Figure 1, but with the enclosing rear wall removed. Referring now in detail to the drawing, I represents a housing of any suitable character upon the face of which appears the dial 2 of a pressure gauge having upon its surface certain graduations. Situated within the housing I is a pipe or conduit 3, connecting the valves 4 and 5 (through the restricted orifice of a bleeder 9). The valve 4 may be of any suitable construction and is adapted to control the flow of compressed air or gas into the bleeder 9.

The valve 5 also may be of any suitable construction and controls the egress of the compressed gaseous fluid from the conduit 3. The dial 2 and indicator 6 are actuated by and subservient to the varying conditions within the member 3 by means of a by-pass 7 which connects the member 3 to a pressure gauge 8 of any suitable character which physically acts upon the indicator 6 which is readable upon the dial 2. Situated adjacent to valve 4 is the bleeder member 9 above referred to, and which is of such a character as to vary the pressure in the conduit 7 in accordance with changes in the rate of flow from the bleeder 9 into the conduit 3 under conditions of leakage. When there is no leakage, and consequently no flow through the conduit 3, the pressure in the conduit 7 will be substantially equal to that in the conduit 3. When, however, there is a gaseous flow through the conduit 3, the action of the bleeder 9 will cause a reduction in the pressure within the conduit 7, which reduction in pressure is measured by the pressure gauge 8.

It will be understood that there is provision made for a supply pipe for the valve 4, the supply pipe not being shown. Also, in connection with valve 5 is an egress pipe not shown. It will be seen from this arrangement that a predetermined pressure may be established within the member 3, provided the valve 5 is closed. The amount of pressure is shown on the dial 2 by the indicator 6. The indicator 6 having been set at zero on the dial initially, it is obvious that by virtue of the by-pass 7 and the bleeder 9 any ingress of air or gas to the member 3 will be indicated on the dial 2, and by the same premises any withdrawal of such gaseous substance from the member 3 will also be indicated.

The egress pipe is in connection with certain confines and it is obvious that the fluid within the member 3 if the valve 5 were open would flow to or occupy certain confines, to wit: if there were fifty units allowed to accumulate within the member 3 the fifty units would occupy the entire volume of the member 3, and the connections thereto. The dial 2 and indicator 6 enables the operator opportunity to adjust the initial pressure within the system.

It is the purpose of my device to establish a given pressure within the member 3, the amount being indicated by said dial 2 and pointer 6, the pointer 6 having been initially set at a "zero" reading corresponding to this given initial pressure. After having built up a given pressure in the member 3 the valve 5 is opened. Obviously as heretofore disclosed if there is no leakage in the engine cylinder or other chamber to which the pipe 3 is connected through the valve 5 (and an extension therefrom) the dial 2 and pointer 6 will show no change of reading, but if there be a leakage, it will show graphically and optically by reason of the dial 2 and pointer 6. But it is intended to allow a continuous reading and a continuous supply of the predetermined number of units, the purpose of which being an extension of the time allowed for the reading and tests for leakage.

Heretofore devices of this character have been able to detect a leakage but have not been able to allow a time factor permitting of the finding of the location of said leakage or the extent of repairs or the efficiency of the repair.

I shall now describe the operation of my device as used to test the cylinders of internal combustion engines. The inlet to valve 4 is connected to a source of compressed air or gas, and the outlet from valve 5 is connected to the interior of the cylinder to be tested as by means of a flexible conduit attached in air-tight relationship to the spark plug opening. The piston of the cylinder to be tested is set at compression stroke and locked in this position as by placing the engine in gear. This will close both the intake and outlet valves of the cylinder. The valve 4 is then opened. When the pointer 6 reaches the limit of its movement, or reaches a predetermined pressure which may be marked "zero" on the dial 2, the valve 5 is opened. This permits the compressed air or gas to flow into the cylinder. If there are no leaks, the pointer 6 will remain at "zero," or will return to "zero" as soon as the air pressure in the cylinder and conduit leading thereto reaches the amount of the pressure which had existed in the conduit 3 before opening the valve 5. If, however, there is a leak there will be a continuous flow through the conduit 3, and the effect of this will be to lower the pressure in the line 1. This in turn will cause the pointer 6 to back away from its "zero" reading, and the magnitude of the arc of its return movement indicates the size of the leak. Thus the pressure gauge 8 indicates the existence of a leak, and once the existence of a leak is established, its location can be found by observing the point or points at which the compressed air or gas is escaping. For example, a leak in the intake valve will permit air to escape through the carburetor, and a leak in the cylinder through the piston rings or piston will permit air to escape through the oil filling pipe. A leak from the combustion chamber due to a cracked head or defective head gasket will be signified by air forced into the radiator through the cooling system which will cause water to overflow therefrom.

Although I have shown in my drawing one form of my invention it is to be understood that I may make a great many minor changes in my invention, not departing from the spirit of my invention, and all the claims should be read in the light thereof.

Having thus described my invention what I claim is:

1. In a device of the character described, a conduit for connection at one end to a source of compressed fluid and at the other end to an enclosed chamber to be tested for leakage, valves for controlling the ingress and egress of compressed fluid into and out of said conduit, a pressure gauge connected to said conduit for measuring pressures therein under both no-leak conditions and leakage conditions, and a restricted passage in said conduit adjacent the point of connection of said pressure gauge, said restricted passage and the point of connection of said pressure gauge being located between said valves.

2. In a device of the character described, a conduit for connection at one end to a source of compressed fluid and at the other end to an enclosed chamber to be tested for leakage, valves for controlling the ingress and egress of compressed fluid into and out of said conduit, a pressure gauge connected to said conduit between said valves for measuring pressure in the conduit under no-leak conditions with the egress valve closed, and means located adjacent the point of connection of said gauge for producing a diminution of the pressure reading of said gauge under leakage conditions with the egress valve open.

MARTIN WEFERS.